(12) United States Patent
Tsuda et al.

(10) Patent No.: US 11,754,046 B2
(45) Date of Patent: Sep. 12, 2023

(54) ROTATING PEDESTAL AND WIND POWER GENERATION SYSTEM

(71) Applicant: Kuninori Tsuda, Tokyo (JP)

(72) Inventors: Kuninori Tsuda, Tokyo (JP); Yoshihisa Koto, Tokyo (JP)

(73) Assignee: Kuninori Tsuda, Tokyo (JP)

( * ) Notice: Subject to any disclaimer, the term of this patent is extended or adjusted under 35 U.S.C. 154(b) by 0 days.

(21) Appl. No.: 17/294,482

(22) PCT Filed: Aug. 7, 2019

(86) PCT No.: PCT/JP2019/031275
§ 371 (c)(1),
(2) Date: May 17, 2021

(87) PCT Pub. No.: WO2020/105233
PCT Pub. Date: May 28, 2020

(65) Prior Publication Data
US 2022/0034300 A1    Feb. 3, 2022

(30) Foreign Application Priority Data

Nov. 19, 2018 (JP) ................................. 2018-216439

(51) Int. Cl.
*F03D 7/04* (2006.01)
*F03D 7/02* (2006.01)

(52) U.S. Cl.
CPC ........... *F03D 7/042* (2013.01); *F03D 7/0204* (2013.01); *F05B 2270/101* (2013.01);
(Continued)

(58) Field of Classification Search
CPC .. F03D 7/0204; F03D 7/042; F05B 2270/101; F05B 2270/32; F05B 2270/321
See application file for complete search history.

(56) References Cited

U.S. PATENT DOCUMENTS 5,506,453 A * 4/1996 McCombs ................ F03D 9/25
290/55
8,354,759 B2 * 1/2013 Marchand ............... F03D 15/20
290/55
(Continued)

FOREIGN PATENT DOCUMENTS

JP    H03-222872 A    10/1991
JP    H07-62471 B    7/1995
(Continued)

OTHER PUBLICATIONS

International Search Report, WIPO, Application No. PCT/JP2019/031275, dated Oct. 21, 2019.
(Continued)

*Primary Examiner* — Tulsidas C Patel
*Assistant Examiner* — Thomas K Quigley
(74) *Attorney, Agent, or Firm* — Greenblum & Bernstein, P.L.C.

(57) ABSTRACT

To provide a rotating pedestal capable of directing a wind power generation apparatus with high accuracy in the direction from which wind comes, regardless of the presence or absence of a duct is an object.
Provided is a rotating pedestal comprising: a bearing that rotatably supports a wind power generation apparatus; a control device that determines a rotational angle based on information regarding a wind direction and a wind speed in a vicinity of the wind power generation apparatus, the information being transmitted from an anemometer installed to be able to measure the wind direction and the wind speed in the vicinity of the wind power generation apparatus; and a motor that rotates the bearing based on the rotational angle determined by the control device.

9 Claims, 4 Drawing Sheets

(52) U.S. Cl.
CPC ..... *F05B 2270/32* (2013.01); *F05B 2270/321* (2013.01); *F05B 2270/80* (2013.01)

(56) References Cited

U.S. PATENT DOCUMENTS

| | | | | |
|---|---|---|---|---|
| 8,678,767 | B2* | 3/2014 | Mok | F03D 7/0236 416/201 A |
| 2011/0241352 | A1* | 10/2011 | Johansen | H02K 9/26 290/55 |
| 2012/0257974 | A1* | 10/2012 | Mok | F03D 7/0236 416/201 A |
| 2013/0224013 | A1* | 8/2013 | De Broe | H01F 38/18 415/213.1 |
| 2013/0277971 | A1* | 10/2013 | Cho | H02P 9/04 290/55 |
| 2015/0240783 | A1* | 8/2015 | Kii | F03D 7/0204 290/44 |
| 2015/0354533 | A1* | 12/2015 | Jakobsson | F03D 80/88 416/1 |
| 2020/0036311 | A1* | 1/2020 | Freire | H02P 21/141 |
| 2020/0049126 | A1* | 2/2020 | Tsuda | F03D 9/25 |
| 2020/0141392 | A1* | 5/2020 | Damgaard | F03D 7/04 |

FOREIGN PATENT DOCUMENTS

| | | |
|---|---|---|
| JP | 2001-50149 A | 2/2001 |
| JP | 2003-097416 A | 4/2003 |
| JP | 2006-307653 | 11/2006 |
| JP | 2015-161172 A | 9/2015 |
| WO | 2018/198580 A1 | 11/2018 |

OTHER PUBLICATIONS

Written Opinion, International Searching Authority, Application No. PCT/JP2019/031275, dated Oct. 21, 2019.

Notice of Reasons for Refusal, Japan Patent Office, in counterpart Japanese Patent Application No. 2018-216439, dated Mar. 14, 2023, with English translation.

* cited by examiner

ROTATING PEDESTAL AND WIND POWER GENERATION SYSTEM

TECHNICAL FIELD

The present invention relates to a rotating pedestal and wind power generation system.

BACKGROUND ART

In recent years, there has been increasing interest in a power generation apparatus that uses clean energy due to consideration for a global environment. As one of such power generation apparatuses, there is a wind power generation apparatus. The wind power generation apparatus is an apparatus that rotates an impeller by wind speed, and converts rotational energy obtained by the rotation of the impeller into electrical energy.

The amount of power generated by the wind power generation apparatus is said to be proportional to the cube of a wind speed, and various studies have been conducted in order to improve the amount of power generation and power generation efficiency. For example, Patent Literature 1 describes an aggregate of wind power generation apparatuses including a plurality of wind power generation apparatuses each having a duct. The aggregate described in Patent Literature 1 is provided so that a support column supporting the wind power generation apparatuses is rotatable via a bearing, and the support column rotates due to the wind speed received by outer peripheral surfaces of the ducts, so that an intake port of each wind power generation apparatus is configured to be directed in the direction from which wind comes.

CITATION LIST

Patent Literature

[Patent Literature 1] Japanese Patent Laid-Open No. 2003-97416

SUMMARY OF INVENTION

Technical Problem

Although the aggregate of the wind power generation apparatuses described in Patent Literature 1 is designed so that the intake port of each wind power generation apparatus can be directed in the direction from which the wind comes, the direction of each intake port is changed by using the wind speed received by the outer peripheral surface of the ducts. Therefore, it is not possible to control the direction of each intake port with high accuracy, and a slight deviation occurs between the direction from which the wind comes, and the direction of the intake port of each wind power generation apparatus. As a result, a turbulence is generated inside each duct due to wind that collides with an inner wall of the duct, and an effect of accelerating the wind cannot be sufficiently obtained. In addition, application to a wind power generation apparatus having no duct is difficult.

The present invention has been made in view of the above problems. That is, one of the problems of the present invention is to provide a rotating pedestal capable of directing a wind power generation apparatus with high accuracy in the direction from which wind comes, regardless of the presence or absence of a duct.

Solution to Problem

The gist of the present invention is as follows.

[1] A rotating pedestal comprising: a bearing that rotatably supports a wind power generation apparatus; a control device that determines a rotational angle based on information regarding a wind direction and a wind speed in a vicinity of the wind power generation apparatus, the information being transmitted from an anemometer installed to be able to measure the wind direction and the wind speed in the vicinity of the wind power generation apparatus; and a motor that rotates the bearing based on the rotational angle determined by the control device.

[2] The rotating pedestal according to above [1], wherein the control device further determines a rotational speed of the bearing based on information regarding the wind direction and/or the wind speed transmitted from the anemometer, and the motor rotates the bearing based on the rotational speed determined by the control device.

[3] The rotating pedestal according to above [1] or [2], further comprising a sensor that detects a direction in which the bearing is directed, and transmits information regarding the detected direction to the control device, wherein the control device determines a rotation direction of the bearing based on comparison between the information regarding the wind direction transmitted from the anemometer, and the information regarding the direction transmitted from the sensor, and the motor rotates the bearing along the rotation direction determined by the control device.

[4] The rotating pedestal according to any one of above [1] to [3], further comprising a slip ring having a rotation axis substantially parallel to a rotation axis of the bearing, wherein power generated by the wind power generation apparatus is able to be output to outside through the slip ring.

[5] The rotating pedestal according to above [4], wherein the slip ring has a plurality of conductor rings disposed side by side in a radial direction of the slip ring, and a plurality of brushes electrically connected to the conductor rings on a side surface of the slip ring.

[6] The rotating pedestal according to above [5], wherein a plurality of input terminals for receiving power generated by the wind power generation apparatus is provided in an upper part of the slip ring, and the plurality of brushes include a brush for external output electrically connected to a terminal for outputting, to outside, the power received by the input terminal, and a brush for power output electrically connected to a terminal for outputting, to a power supply of the rotating pedestal, the power received by the input terminal.

[7] A wind power generation system comprising: the rotating pedestal according to any one of above [1] to [6]; and a wind power generation apparatus rotatably supported by the rotating pedestal, wherein the wind power generation apparatus has a duct.

Advantageous Effects of Invention

According to the rotating pedestal according to the present invention, a wind power generation apparatus can be directed with high accuracy in the direction from which wind comes regardless of the presence or absence of a duct, by controlling the rotational angle of a rotating pedestal based on information, regarding the wind direction and the wind speed in the vicinity of the wind power generation apparatus, the information being transmitted from an anemometer installed such that the wind direction and the wind speed in the vicinity of the wind power generation apparatus can be measured. As a result, it is possible to improve the amount of power generation and the power generation efficiency of the wind power generation apparatus.

DESCRIPTION OF EMBODIMENTS

Hereinafter, an embodiment of the present invention will be described with reference to the drawings, but the present invention is not limited to the drawings and the embodiment. The present invention is not limited to a preferable numerical value and a configuration described below.

[Rotating Pedestal]

Figure 1:
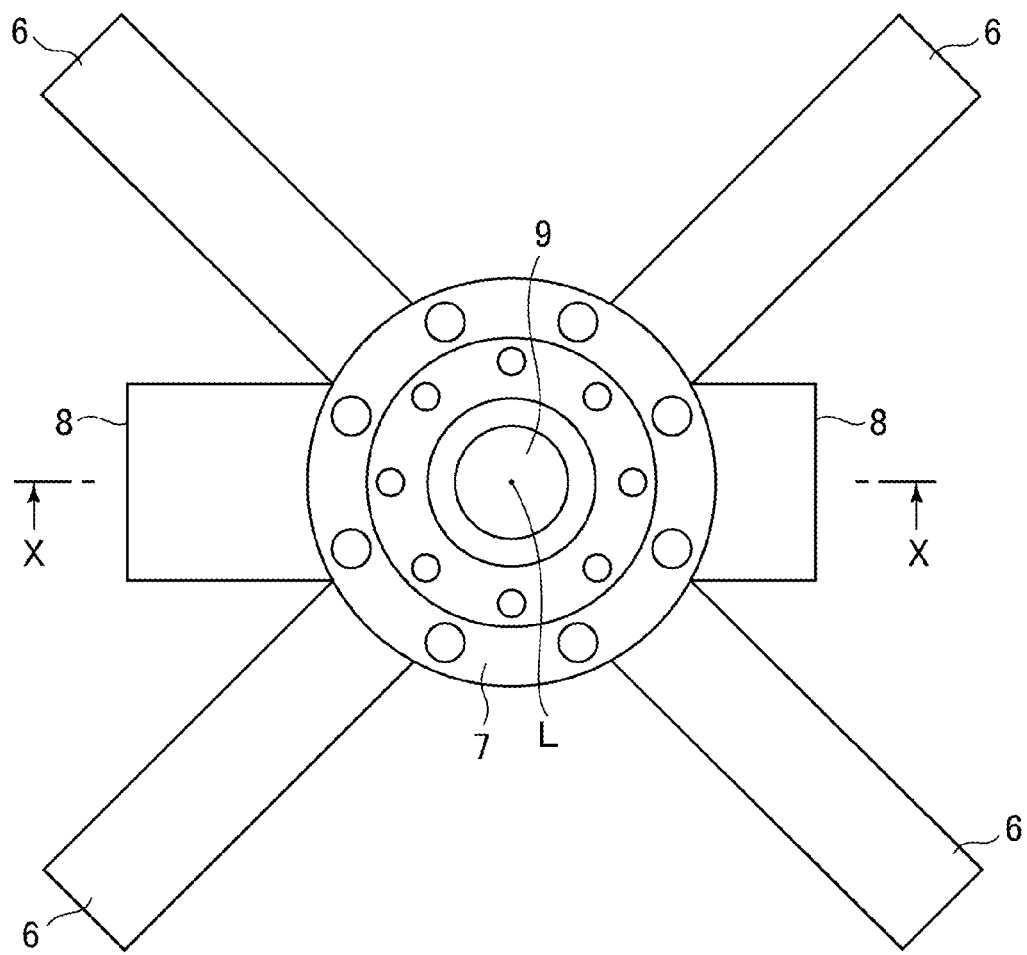
FIG. 1 is a top view illustrating an example of a rotating pedestal according to the embodiment of the present invention.
Figure 2:
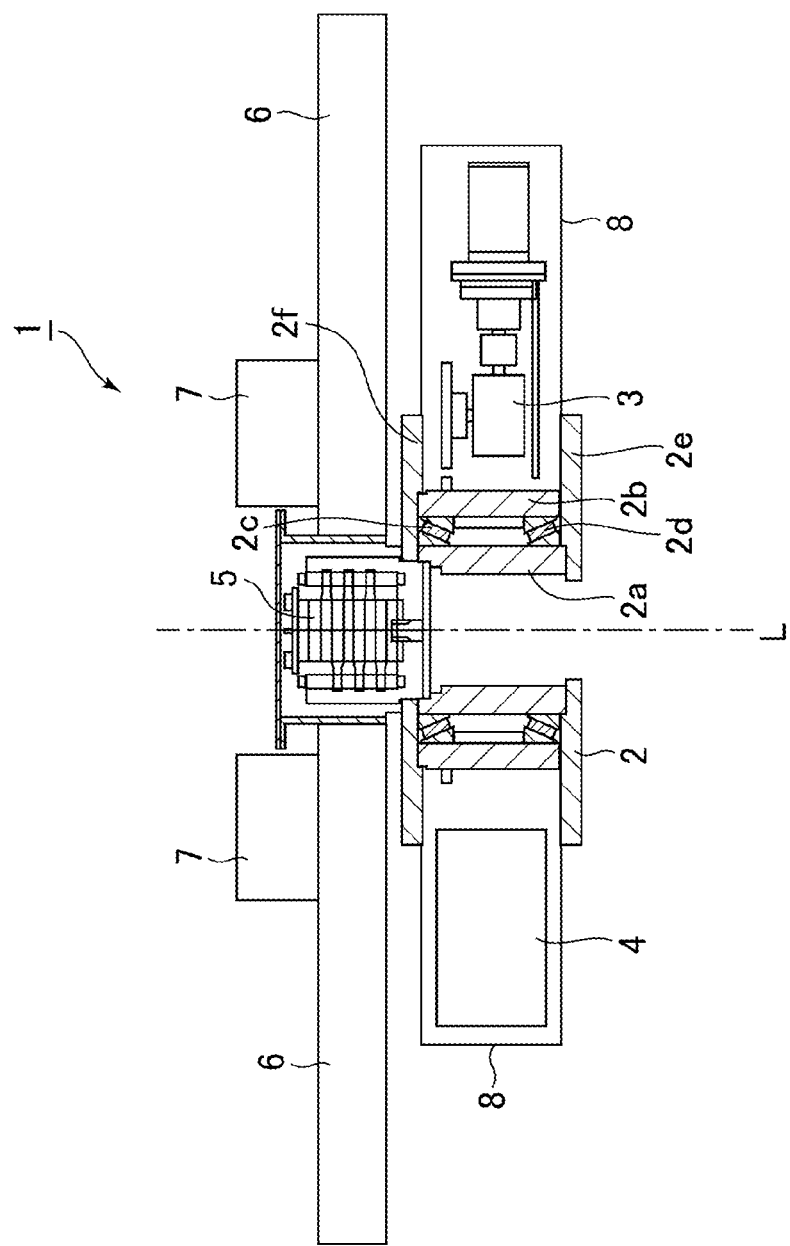
FIG. 2 is a partial sectional view illustrating an example of the rotating pedestal taken along the XX line illustrated in FIG. 1.

A rotating pedestal will be hereinafter described in detail. FIG. 1 is a top view illustrating an example of a rotating pedestal according to the embodiment of the present invention. FIG. 2 is a partial sectional view illustrating an example of the rotating pedestal taken along the XX line illustrated in FIG. 1. The rotating pedestal 1 illustrated in FIG. 1 and FIG. 2 includes a bearing 2, a motor 3, a control device 4, a slip ring 5, support plates 6, a flange 7, and a cover 8.

The bearing 2 is a double-structured ball bearing having a rotation axis L. The bearing is a double structure type bearing, and therefore is strong against moment that acts on the bearing 2 and can improve durability and safety of the rotating pedestal 1.

The bearing 2 includes an inner ring 2a, an outer ring 2b, a plurality of upper rolling elements 2c, a plurality of lower rolling elements 2d, a lower plate 2e, and an upper plate 2f. The upper rolling elements 2c and the lower rolling elements 2d rotate along the rotation axis L, and the outer ring 2b is provided to be rotatable with respect to the inner ring 2a. The inner ring 2a is fixed to the lower plate 2e, but is not fixed to the upper plate 2f. The outer ring 2b is fixed to the upper plate 2f, but is not fixed to the lower plate 2e. Therefore, while the upper plate 2f rotates with the rotation of the outer ring 2b, the inner ring 2a and the lower plate 2e do not rotate.

In FIG. 1, the bearing 2 is not illustrated because the bearing 2 is hidden by the flange 7. However, in a case where the bearing 2 is viewed from above, the shape of the bearing 2 has substantially a donut shape with a center hole 9 located at the center. In FIG. 1, the rotation axis L is an axis that passes through a substantial center of the center hole 9.

As the bearing 2, instead of the above double-structured ball bearing, a known bearing such as a roller bearing, a tapered roller bearing, and a needle bearing may be used.

The motor 3 is provided such that motive power for rotating the outer ring 2b can be transmitted to the outer ring 2b. The type of a motor used for the motor 3 is not particularly limited, and, for example, a brush motor, a brushless motor, a stepping motor, or the like can be used. Among these motors, it is preferable to use a brushless motor from the viewpoint of high durability and efficient high torque output.

The operation of the motor 3 is controlled by the control device 4 described later. It is preferable that the motor 3 operates based on, for example, the rotational angle, the rotational speed, the rotation direction, or the like determined by the control device 4.

The control device 4 receives information regarding the wind direction and the wind speed in the vicinity of a wind power generation apparatus from an anemometer installed such that the wind direction and the wind speed in the vicinity of the wind power generation apparatus can be measured. The control device 4 and the anemometer may be connected by wire or may be connected wirelessly.

The anemometer is not particularly limited as long as the anemometer can measure the wind direction and the wind speed in the vicinity of the wind power generation apparatus, and a conventionally known one such as a wind turbine type anemometer can be used. It is preferable to use an ultrasonic anemometer from the viewpoint that maintenance is not required because the ultrasonic anemometer does not have a drive system.

The vicinity of the wind power generation apparatus in which the anemometer is installed is not particularly limited, but for example, the anemometer is preferably located within a radius of 3 m from an impeller of the wind power generation apparatus, and is more preferably located within a radius of 2 m. In a case where the wind power generation apparatus is provided with a duct, a place where the anemometer is installed is preferably a position within a radius of 3 m from an intake port of the duct, and more preferably a position within a radius of 2 m. By measuring the wind direction and the wind speed at the above positions, it is possible to direct the direction of the wind power generation apparatus in the more appropriate direction. As a result, it is possible to improve the power generation efficiency of the wind power generation apparatus.

The control device 4 determines the rotational angle of the rotating pedestal 1 (rotational angle of the outer ring 2b) based on the received information regarding the wind direction and the wind speed. The control device 4 preferably determines the rotational angle such that, for example, the impeller of the wind power generation apparatus supported by the rotating pedestal 1 substantially faces the wind direction. With such a configuration, it is possible to improve the power generation efficiency of the wind power generation apparatus.

In a case where the wind speed is large enough to exceed a predetermined threshold value and a load on the wind power generation apparatus becomes excessive, for example, the control device 4 preferably determines the rotational angle such that the impeller of the wind power generation apparatus supported by the rotating pedestal 1 does not substantially face the wind direction. With such a configuration, it is possible to reduce a possibility of failure of the wind power generation apparatus, and to improve safety. The above predetermined threshold value can be appropriately set depending on the size, the weight, the durability, and the like of the wind power generation apparatus. For example, the wind speed is preferably 30 m/s, and more preferably 20 m/s.

In a case where the wind speed becomes larger than the above predetermined threshold value (for example, wind speed 40 m/s or more, preferably wind speed 60 m/s or more), it is preferable to control such that the direction of the intake port and the like is directed in the direction from which wind comes slowly, in order to prevent very strong cross wind received by the wind power generation apparatus from destroying the wind power generation apparatus.

The control device 4 preferably determines the rotational speed of the rotating pedestal 1 (rotational speed of the outer ring 2b) based on the received information regarding the wind direction and the wind speed. For example, in a case where the wind speed is low, it is preferable to make the impeller substantially face the wind direction more quickly to improve the power generation efficiency. In a case where the wind speed is high, it is preferable to slow down the rotational speed in order to reduce the load on the wind power generation apparatus and the rotating pedestal due to the wind, and reduce the rate of occurrence of failure.

It is preferable that the rotating pedestal 1 further includes a sensor (not illustrated) capable of detecting the direction in which the bearing 2 is directed, and transmitting, to the control device 4, information regarding the detected direction. The sensor is not particularly limited. However, for example, a digital compass is preferable from the viewpoint of being able to detect an accurate direction without being affected by magnetism due to power (current) sent from the wind power generation apparatus.

It is preferable that the control device 4 determines the rotation direction (rotation direction of the outer ring 2b) and the rotational angle of the rotating pedestal 1 based on comparison between the information regarding the wind direction and the wind speed transmitted from the anemometer and the information regarding the direction transmitted from the sensor. With such a configuration, it is possible to determine which of clockwise rotation and counterclockwise rotation is more appropriate, and more quickly make the impeller substantially face the wind direction, and improve power generation efficiency.

It is preferable that the rotating pedestal 1 further includes a power circuit (not illustrated) and a battery (not illustrated) for supplying power to the motor 3 and the control device 4. The battery is preferably configured to be capable of storing power to be transmitted via the slip ring 5 described later, the power being generated by the wind power generation apparatus.

The slip ring 5 is provided to be able to output the power generated by the wind power generation apparatus to the outside via the slip ring 5 without causing a trouble due to the rotation of the rotating pedestal 1 and the wind power generation apparatus supported by the rotating pedestal 1. As the slip ring 5, a conventionally known slip ring can be used. For example, an SR type slip ring illustrated in FIG. 1 is preferable.

The slip ring 5 has, for example, a rotation axis substantially parallel to the rotation axis L of the bearing 2, and preferably has a rotation axis substantially the same as the rotation axis L. It is preferable that the slip ring 5 has a plurality of conductor rings disposed along the radial direction of the slip ring 5 (direction along the rotation axis of the slip ring 5), and a plurality of brushes electrically connected to the conductor rings on a side surface of the slip ring.

One or more input terminals for receiving the power transmitted from the wind power generation apparatus is provided in an upper part of the slip ring 5. Each conductor ring is, for example, electrically connected to a corresponding input terminal, and has a structure that is rotatable at 360 degrees independently.

One or more brushes are provided on the side surface of each conductor ring, and the conductor rings and the brushes are electrically connected to each other. In a case where the conductor rings rotate, the brushes do not rotate, but the electrical connection between the conductor rings and the brushes is maintained. The brushes are electrically connected to external output terminals for outputting power to the outside. With such a structure, even when the input terminal side is in a rotating state, it is easy to normally output power to the outside without causing any trouble such as entanglement of a power transmission cable connected to the input terminal from the wind power generation apparatus.

The width of each brush (the length in the radial direction of the slip ring 5) is not particularly limited. However, for example, from the viewpoint that the influence on energization by the rotation of the conductor rings is reduced, and that wear of contact of the conductor ring and the brushes is reduced, the width of each brush is preferably 1 mm or more, more preferably 3 mm or more, and further preferably 5 mm or more. On the other hand, for example, from the viewpoint of space saving, the width of each brush is preferably 15 mm or less, more preferably 10 mm or less, and further preferably 6 mm or less.

The slip ring 5 preferably includes an input terminal for power output for outputting power to a power supply (the power circuit and the battery) of the rotating pedestal 1 in addition to the input terminal that finally outputs power to the external output terminal (input terminal for external output). The conductor ring electrically connected to the input terminal for power output is preferably electrically connected to the power supply of the rotating pedestal 1 via the brushes in contact with the conductor rings. With such a configuration, the rotating pedestal 1 can be rotated by the power generated by the wind power generation apparatus.

The support plate 6 is provided to rotate in conjunction with the upper plate 2f of the bearing 2. The shape and the number of the support plates 6 are not particularly limited, and may be appropriately set according to the size, the weight and the like of the wind power generation apparatus to be supported. The support plates 6 illustrated in FIG. 1 and FIG. 2 each have a rectangular shape having a predetermined thickness, and a total of four plates are provided at angles of 90 degrees each. The support plates 6 are provided, so that the stability of the rotating pedestal 1 can be improved.

The flange 7 is connected to the support plates 6 by bolts or the like, and is provided to rotate in conjunction with the upper plate 2f of the bearing 2. The flange 7 is connected to the wind power generation apparatus by bolts or the like to support the wind power generation apparatus. The shape and the like of the flange 7 are not particularly limited, and may be appropriately set according to the size, the weight, the shape and the like of the wind power generation apparatus to be supported.

The cover 8 is provided in order to protect the motor 3, the control device 4, the power circuit, the battery, and the like from wind and rain. The cover 8 and members provided inside the cover 8 do not rotate with the rotation of the outer ring 2b, and maintain fixed positions. The material of the cover 8 is not particularly limited, but for example, fiber reinforced plastic, acrylic resin, polycarbonate or the like are preferable from the viewpoint of excellent strength and weather resistance. Further, a material to which an ultraviolet absorber, carbon black or the like is added is also preferable from the viewpoint of weather resistance.

Figure 3:
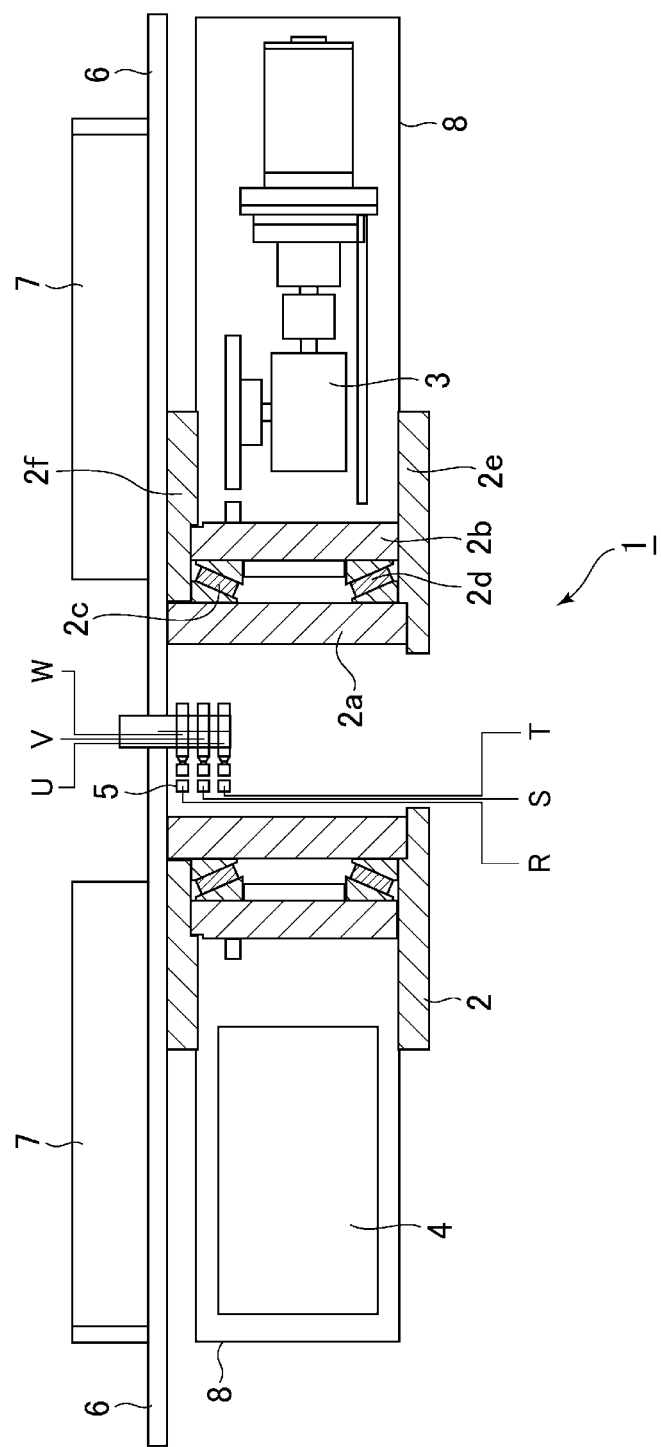
FIG. 3 is a partial cross-sectional view illustrating an example of a rotating pedestal according to an embodiment of the present invention.

FIG. 3 is a partial cross-sectional view illustrating an example of a rotating pedestal according to an embodiment of the present invention. Specifically, FIG. 3 is a modification of the rotating pedestal illustrated in FIG. 1 and FIG. 2, and illustrates a state in which the three-phase alternating current input is applied to a slip ring 5.

In the rotating pedestal 1 of FIG. 3, the wind power generation apparatus and the slip rings 5 are connected by a three-phase three-wire system. The U-phase is output to the outside as the R-phase via the conductor ring located at the top. The V phase is output to the outside as the S-phase via the conductor ring located at the second position from the top. The W-phase is output to the outside as the T-phase via the third conductor ring from the top. Power by three-phase alternating current is transmitted, so that it is possible to reduce electric loss during the power transmission.

Other members constituting the rotating pedestal 1 in FIG. 3 are different in shape and size from the rotating pedestal 1 illustrated in FIG. 1 and FIG. 2, but have the same roles. That is, in the rotating pedestal 1 illustrated in FIG. 3, as to members denoted by the same reference numerals as the members constituting the rotating pedestal 1 illustrated in FIG. 1 and FIG. 2, the contents described using FIG. 1 and FIG. 2 can be adopted within a necessary range.

Figure 4:
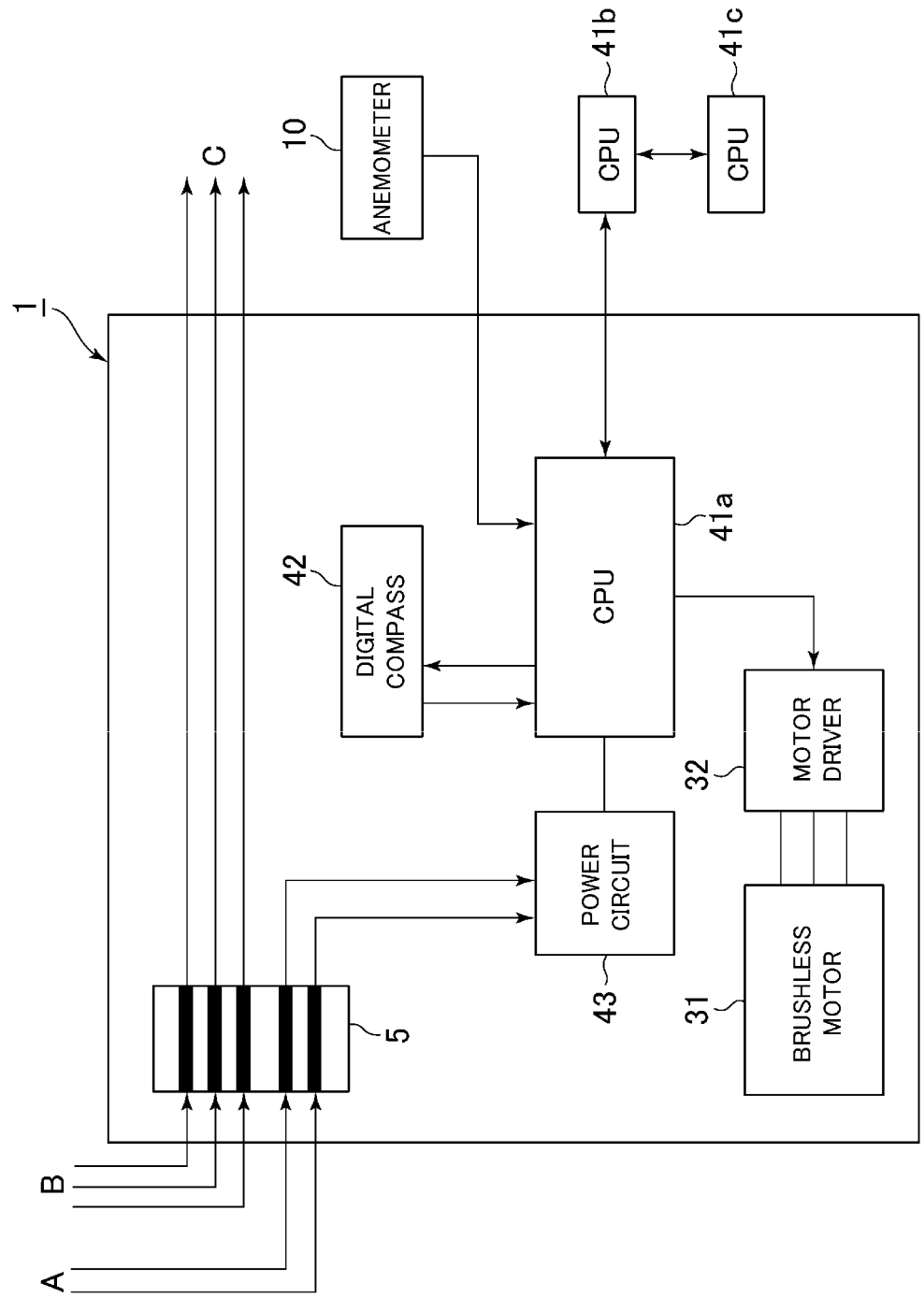
FIG. 4 is a block diagram illustrating an example of a configuration of the rotating pedestal according to the embodiment of the present invention.

FIG. 4 is a block diagram illustrating an example of a configuration of the rotating pedestal according to the embodiment of the present invention. An arrow A indicates DC power sent from the wind power generation apparatus, and the DC power is sent to a power circuit 43 via the slip ring 5 and stored in a battery (not illustrated). The battery is electrically connected to a CPU 41a (control device), a motor driver 32, and a brushless motor 31, and power stored in the battery serves as a power supply for the above members. An arrow B indicates three-phase alternating current power sent from the wind power generation apparatus, and the three-phase alternating current power is transmitted to the outside of the rotating pedestal 1 via the slip ring 5 as illustrated by an arrow C.

The CPU 41a receives information regarding the wind direction and the wind speed in the vicinity of the wind power generation apparatus from the anemometer 10 installed in the vicinity of the wind power generation apparatus supported by the rotating pedestal 1. Further, the CPU 41a receives, from a digital compass 42, information regarding the direction in which the rotating pedestal 1 (bearing) is directed. The CPU 41a determines the rotational angle, the rotational speed, and the rotation direction of the rotating pedestal 1 based on the information regarding the wind direction and the wind speed, the information regarding the direction in which the rotating pedestal 1 is directed, and comparison between the information regarding the wind direction and the wind speed, and the information regarding the direction in which the rotating pedestal 1 is directed.

The rotating pedestal 1 may be configured such that a plurality of the rotating pedestals can be used by communication connection. In such a configuration, for example, it is preferable that the rotational angle and the like of all rotating pedestals connected by communication is controlled based on information from one anemometer 10. Specifically, it is preferable that one CPU 41a configured to receive information from the anemometer 10 determines the rotational speed and the like of each rotating pedestal 1, and transmits the determined information to the subsequent CPU of rotating pedestals sequentially, for example, transmits from the CPU 41a to a CPU 41b and then to a CPU 41c. The communication connection may be wireless connection or may be wired connection.

In this case, it is preferable that the operation information and the like can be transmitted from the downstream CPU to the upstream CPU, for example, from the CPU 41c to the CPU 41b and then from the CPU 41b to the CPU 41a. For example, the CPU 41a stores the number of rotating pedestals connected downstream, so that it is possible to issue an alert when communication from the downstream rotating pedestals is interrupted. Further, for example, the CPU 41a may be configured to issue an alert in a case where the CPU 41 receives information indicating an operation abnormality from the downstream rotating pedestal. In the above example, a plurality of the rotating pedestals are connected and communicated in series. However, one CPU and a plurality of other CPUs may be connected and communicated in parallel to each other, for example, the CPU 41a and the CPU 41b, and the CPU 41a and the CPU 41c.

The information regarding the rotational angle, the rotational speed, and the rotation direction of the rotating pedestal 1 determined by the CPU 41a is transmitted to the motor driver 32. The motor driver 32 drives the brushless motor 31 based on the received information. The brushless motor 31 is driven, so that the rotating pedestal rotates.

[Wind Power Generation System]

The wind power generation apparatus supported by the rotating pedestal according to the present invention is not particularly limited. However, for example, from the viewpoint that the effect of improving the power generation efficiency obtained when the wind power generation apparatus is made to substantially face the current wind direction is large, a horizontal axis type wind power generation apparatus is preferable, and the wind power generation apparatus provided with a duct is more preferable.

The horizontal axis type wind power generation apparatus provided with the duct is rotatably supported by a rotating pedestal as described above, so that, for example, in a case where the wind speed is low, an intake port of the duct is directed instantly in the direction from which wind comes, and it is possible to improve power generation efficiency. For example, in a case where the wind speed is high and a load on an impeller of the wind power generation apparatus becomes too large, the intake port of the duct is controlled such that the intake port is not directed in the direction from which wind comes, and a failure rate of the wind power generation apparatus can be reduced. For example, in a case where the wind speed is very high and there is a risk that the wind power generation apparatus collapses due to very strong crosswind received by the duct, the intake port is controlled such that the direction of the intake port is directed toward the direction from which wind comes slowly. Consequently, it is possible to reduce the possibility of the collapse of the wind power generation apparatus.

REFERENCE SIGNS LIST

1 ROTATING PEDESTAL
2 BEARING
2a INNER RING
2b OUTER RING
2c UPPER ROLLING ELEMENTS
2d LOWER ROLLING ELEMENTS
2e LOWER PLATE
2f UPPER PLATE
3 MOTOR
4 CONTROL DEVICE
5 SLIP RING
6 SUPPORT PLATES
7 FLANGE
8 COVER
9 CENTER HOLE
10 ANEMOMETER
31 BRUSHLESS MOTOR

32 MOTOR DRIVER
41a CPU
41b CPU
41c CPU
42 DIGITAL COMPASS
43 POWER CIRCUIT

The invention claimed is:

1. A rotating pedestal comprising:
a bearing that rotatably supports a wind power generation apparatus;
a control device that is configured to determine a rotational angle based on a wind direction and a wind speed in a vicinity of the wind power generation apparatus, the wind direction and the wind speed being transmitted from an anemometer installed to be configured to measure the wind direction and the wind speed in the vicinity of the wind power generation apparatus; and
a motor that rotates the bearing based on the rotational angle determined by the control device, wherein
the control device is further configured to determine a rotational speed of the bearing based on the wind speed transmitted from the anemometer, and
the motor rotates the bearing based on the rotational speed determined by the control device.

2. The rotating pedestal according to claim 1, further comprising a sensor that detects a direction in which the bearing is directed, and transmits the detected direction to the control device, wherein
the control device is configured to determine a rotation direction of the bearing based on a comparison between the wind direction transmitted from the anemometer, and the detected direction transmitted from the sensor, and
the motor rotates the bearing along the rotation direction determined by the control device.

3. The rotating pedestal according to claim 1, further comprising a slip ring having a rotation axis substantially parallel to a rotation axis of the bearing, wherein
power generated by the wind power generation apparatus is to be output to an outside through the slip ring,
the slip ring includes a conductor ring, and
the conductor ring includes a structure that is rotatable 360 degrees.

4. The rotating pedestal according to claim 3, wherein the slip ring has a plurality of conductor rings disposed side by side in an axial direction of the slip ring, and a plurality of brushes electrically connected to the conductor rings on a side surface of the slip ring.

5. The rotating pedestal according to claim 4, wherein
a plurality of input terminals to receive power generated by the wind power generation apparatus is provided in an upper part of the slip ring, and
the plurality of brushes include a brush for external output electrically connected to a terminal to output, to the outside, the power received by at least one of the input terminals, and a brush for power output electrically connected to a terminal to output, to a power supply of the rotating pedestal, the power received by at least one of the input terminals.

6. A wind power generation system comprising:
the rotating pedestal according to claim 1; and
the wind power generation apparatus rotatably supported by the rotating pedestal, wherein
the wind power generation apparatus has a duct.

7. The wind power generation system according to claim 6, wherein
the anemometer is located within a radius of 3 m from either an impeller of the wind power generation apparatus or an intake port of the duct.

8. The rotating pedestal according to claim 3, wherein
the slip ring includes a plurality of slip rings connected to the wind power generation apparatus by a three-phase three-wire system.

9. The rotating pedestal according to claim 1, wherein
the bearing further includes an upper plate fixed to the outer ring, and a lower plate fixed to the inner ring, and
the control device is disposed between the upper plate and the lower plate.

* * * * *